(12) United States Patent
Tuerk et al.

(10) Patent No.: US 12,162,449 B2
(45) Date of Patent: Dec. 10, 2024

(54) ELECTROMECHANICAL BRAKE PRESSURE GENERATOR INCLUDING SPINDLE DRIVE UNIT, BRAKING SYSTEM

(71) Applicant: Robert Bosch GmbH, Stuttgart (DE)

(72) Inventors: Florian Tuerk, Besigheim (DE); Willi Nagel, Remseck/Hochdorf (DE); Claus Oehler, Karlsruhe (DE); Mark Boehm, Lehrensteinsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 443 days.

(21) Appl. No.: 17/370,422

(22) Filed: Jul. 8, 2021

(65) Prior Publication Data
US 2022/0024435 A1   Jan. 27, 2022

(30) Foreign Application Priority Data

Jul. 17, 2020   (DE) .................... 10 2020 208 956.6

(51) Int. Cl.
*B60T 13/74*   (2006.01)
*F15B 15/20*   (2006.01)
*F16C 21/00*   (2006.01)

(52) U.S. Cl.
CPC ............ *B60T 13/745* (2013.01); *F15B 15/20* (2013.01); *F16C 21/00* (2013.01); *B60T 2201/03* (2013.01);
(Continued)

(58) Field of Classification Search
CPC .......... F16D 2125/023; F16D 2125/40; F16D 2125/50; F16D 2121/24; B60T 13/745;
(Continued)

(56) References Cited

U.S. PATENT DOCUMENTS 6,153,988 A * 11/2000 Reimann ................. F16D 65/18
                                                    318/40
2007/0062769 A1 * 3/2007 Noh ...................... B60T 13/588
                                                    188/162
(Continued)

FOREIGN PATENT DOCUMENTS

DE   102009001359 A1 * 9/2010 ............. F01C 21/02
DE   102009015827 A1 * 10/2010 ............. F03D 80/70
(Continued)

*Primary Examiner* — Robert A. Siconolfi
*Assistant Examiner* — San M Aung
(74) *Attorney, Agent, or Firm* — NORTON ROSE FULBRIGHT US LLP; Gerard A. Messina

(57) ABSTRACT

An electromechanical brake pressure generator including a spindle drive unit for converting a rotational motion of an electric motor-driven drive shaft into a translatory motion of a piston that is coupled to the spindle drive unit, the spindle drive unit being operatively connected to the drive shaft via a multi-stage transmission. The multi-stage transmission is a planetary gear set having a first and a second stage. With the aid of the transmission, a spindle or a spindle nut of the spindle drive unit is drivable, which is rotatably mounted in a housing of the brake pressure generator via a bearing assembly receiving axial and radial forces. A braking system for a vehicle including an electromechanical brake pressure generator is also described.

12 Claims, 3 Drawing Sheets

(52) U.S. Cl.
CPC ..... *B60T 2270/82* (2013.01); *F15B 2015/206* (2013.01)

(58) Field of Classification Search
CPC ............... B60T 8/4018; B60T 2201/03; B60T 2270/82; F04B 17/03; F16C 25/083; F16C 27/066; F16C 27/08; F16C 21/00; F15B 15/20; F15B 2015/206
USPC ........................................................ 188/358
See application file for complete search history.

(56) References Cited

U.S. PATENT DOCUMENTS

| | | | | |
|---|---|---|---|---|
| 2015/0076972 A1* | 3/2015 | Leiber | .................... | H02K 11/22 310/68 B |
| 2016/0068147 A1* | 3/2016 | Hatt | ........................ | F16H 25/24 74/409 |
| 2017/0030445 A1* | 2/2017 | Weh | ........................ | F15B 15/14 |
| 2017/0130792 A1* | 5/2017 | Tandler | ................ | B60T 13/741 |
| 2017/0259799 A1* | 9/2017 | Weh | ........................ | F04B 9/02 |
| 2018/0345934 A1* | 12/2018 | Weh | ...................... | B60T 8/4018 |
| 2020/0361434 A1* | 11/2020 | Weh | ...................... | B60T 8/4018 |

FOREIGN PATENT DOCUMENTS

| | | | | |
|---|---|---|---|---|
| WO | 2017045804 A1 | 3/2017 | | |
| WO | WO-2019037965 A1 * | 2/2019 | ............ | B60T 13/745 |

\* cited by examiner

ELECTROMECHANICAL BRAKE PRESSURE GENERATOR INCLUDING SPINDLE DRIVE UNIT, BRAKING SYSTEM

FIELD

The present invention relates to an electromechanical brake pressure generator including a spindle drive unit. The spindle drive unit is used to convert a rotational motion of an electric motor-driven drive shaft into a translatory motion of a piston that is coupled to the spindle drive unit.

Not only is the provided electromechanical brake pressure generator intended to provide a brake assistance, but also to be usable for sole generation of the brake force in so-called brake-by-wire systems. In this implementation, it may be used in particular for brake force or brake pressure generation in autonomously driving vehicles.

For this reason, a braking system for a vehicle is furthermore provided that includes an electromechanical brake pressure generator according to the present invention.

BACKGROUND INFORMATION

In an electromechanical brake pressure generator, the drive shaft may be situated in an axis-parallel manner or coaxially to the spindle drive unit or to the piston. The present invention primarily relates to electromechanical brake pressure generators, in which the drive shaft is coaxially situated. A brake pressure generator of this type is described in PCT Patent Application No. WO 2017/045804 A1 by way of example.

An object of the present invention is to provide an optimized design for an electromechanical brake pressure generator. In particular, the positioning of the spindle drive unit is to be improved by using the available installation space.

To achieve the object, the electromechanical brake pressure generator is provided. Advantageous refinements of the present invention are disclosed herein. Moreover, a braking system for a vehicle is provided including an electromechanical brake pressure generator according to the present invention.

SUMMARY

In accordance with an example embodiment of the present invention, a electromechanical brake pressure generator includes a spindle drive unit for converting a rotational motion of an electric motor-driven drive shaft into a translatory motion of a piston that is coupled to the spindle drive unit. The spindle drive unit is operatively connected to the drive shaft via a multi-stage transmission. According to an example embodiment of the present invention, the multi-stage transmission is a planetary gear set having a first and a second stage. With the aid of the transmission, a spindle or a spindle nut of the spindle drive unit is drivable, which is rotatably mounted in a housing of the brake pressure generator via a bearing assembly receiving axial and radial forces.

The use of a multi-stage transmission in the form of a planetary gear set is advantageous in particular in the case of a coaxial positioning of a drive shaft and a spindle drive unit, since in this case a brake pressure generator is created that may be constructed in a very compact manner at least in the radial direction. In the axial direction, the installation space requirement may slightly increase due to the multiple stages of the planetary gear set. This is counteracted, however, in the present case by constructing the bearing assembly in a compact manner with regard to the rotatable bearing of the spindle or the spindle nut. The bearing assembly is able to receive axial as well as radial forces.

At the same time, a great transmission ratio may be implemented with the aid of the multi-stage planetary gear set.

According to a first preferred specific embodiment of the present invention, the bearing assembly includes an axial needle bearing for receiving the axial forces and a radial slide bearing for receiving the radial forces. In this way, a bearing assembly may be created that requires little installation space in the axial and radial directions. The use of needles as rolling elements reduces the axial installation height. The design of a slide bearing without rolling elements essentially does not require additional installation space.

According to a further preferred specific embodiment of the present invention, the bearing assembly includes an angular ball bearing for receiving axial and radial forces. The angular ball bearing combines axial and radial bearings in one single bearing, so that this specific embodiment also considerably saves installation space.

The bearing assembly is preferably completely accommodated or recessed in the housing, so that the bearing assembly does not require additional installation space. Furthermore, the bearing assembly is preferably integrated into the housing by using installation space that has not been used so far. Here, an area may be involved, for example, which is delimited on the one hand by the planetary gear set in the axial direction and on the other hand, by a housing wall that separates the bearing assembly from a main brake cylinder integrated into the housing. Radially inward, the area may be delimited by a torque support of the spindle nut or the spindle. Radially outward, a current and/or signal line leading to an electric motor or sensor may represent the delimitation.

In accordance with an example embodiment of the present invention, it is furthermore provided that the bearing assembly is fastened in the housing via an outer ring of the bearing assembly, for example by caulking or screwing the outer ring in the housing. In the case of caulking, cutting a male thread at the outer ring may be dispensed with, so that this approach may be implemented particularly easily and cost-effectively. The screw connection has the advantage that it may be disengaged, if needed, without being destroyed.

Furthermore, the bearing assembly preferably surrounds the spindle and/or the spindle nut. This means that the bearing assembly does not result in an enlargement of the total installation length of the brake pressure generator. The latter is solely predefined by the installation lengths of the spindle drive unit, of the planetary gear set, and of the drive shaft. The bearing assembly thus does not require additional installation space in the axial direction.

The spindle is preferably manufactured from a metal, in particular from steel or aluminum, since the spindle is subjected to great stress, and metallic materials are highly stable.

The spindle nut may, in contrast, be manufactured from plastic, so that it may be made cost-effectively.

In one refinement of the present invention, it is provided that the bearing assembly includes a pot-shaped inner ring that has a one-piece or a multi-part design and a pot bottom for connecting with the spindle or the spindle nut, on the one hand, as well as for connecting with the transmission, on the other hand. The pot shape of the inner ring facilitates a positioning of the bearing assembly at the level of the spindle or the spindle nut, since the inner ring continues to slide past the offset in the direction of the piston coupled to the spindle drive unit at the opposite end. The area of the offset may be moreover used for implementing the bearing, so that the rolling elements including the outer ring do not protrude beyond the pot bottom in the axial direction.

For the purpose of connecting with the spindle or the spindle nut, depending on which component is driven via the drive shaft, the pot bottom may have a central opening, in which the spindle or the spindle nut is sectionally accommodated. The connection with the transmission or the planetary gear set may take place via pins, for example. The pot bottom is thus the planetary carrier at the same time.

The multi-part design of the inner ring of the bearing assembly may have an advantage that on the one hand, the manufacture of the individual parts is simplified and on the other hand, the materials that are optimal for the particular function of a part are selected. Parts of the inner ring that form a contact surface for the rolling elements must in general be manufactured from a material that may be hardened, since rolling elements require a hard and sanded contact surface. The material may thus be in particular a material containing carbon. Since during the hardening of the material the part may be distorted, so that a laborious post-processing of the part may become necessary, in particular in the area of openings/bores in the pot bottom, another material lends itself for the design of the pot bottom, which in particular does not have to be subjected to a hardening process.

In accordance with an example embodiment of the present invention, it is furthermore provided that the bearing assembly, preferably the inner ring of the bearing assembly, is supported at the housing via a plastic ring in the axial direction. The plastic ring forms a slide bearing for the case that the part of the spindle drive unit, i.e., the spindle or the spindle nut, which is driven with the aid of the drive shaft, pulls in the axial direction.

The bearing assembly is ideally a pre-assembled structural unit that is installed as a unit. In this way, the mounting of the brake pressure generator may be simplified. In addition, the bearing assembly may be already filled with grease. In a refinement of the present invention, it is thus further provided that the bearing assembly includes a clip ring that holds the bearing assembly together. With the aid of the clip ring, it is thus possible to pre-assemble the bearing assembly and install it as a pre-assembled unit into the housing of the brake pressure generator. Alternatively or in addition, the clip ring may be a slide bearing.

Since the preferred range of application of the brake pressure generator according to the present invention is a vehicle, a braking system for a vehicle is furthermore provided that includes an electromechanical brake pressure generator according to the present invention. The advantages of the brake pressure generator according to an example embodiment of the present invention, in particular the little installation space requirement or the short installation length, are of particular importance in a vehicle.

Preferred specific embodiments of the present invention are explained in greater detail below on the basis of the figures.

DETAILED DESCRIPTION OF EXAMPLE EMBODIMENTS

Figure 1:
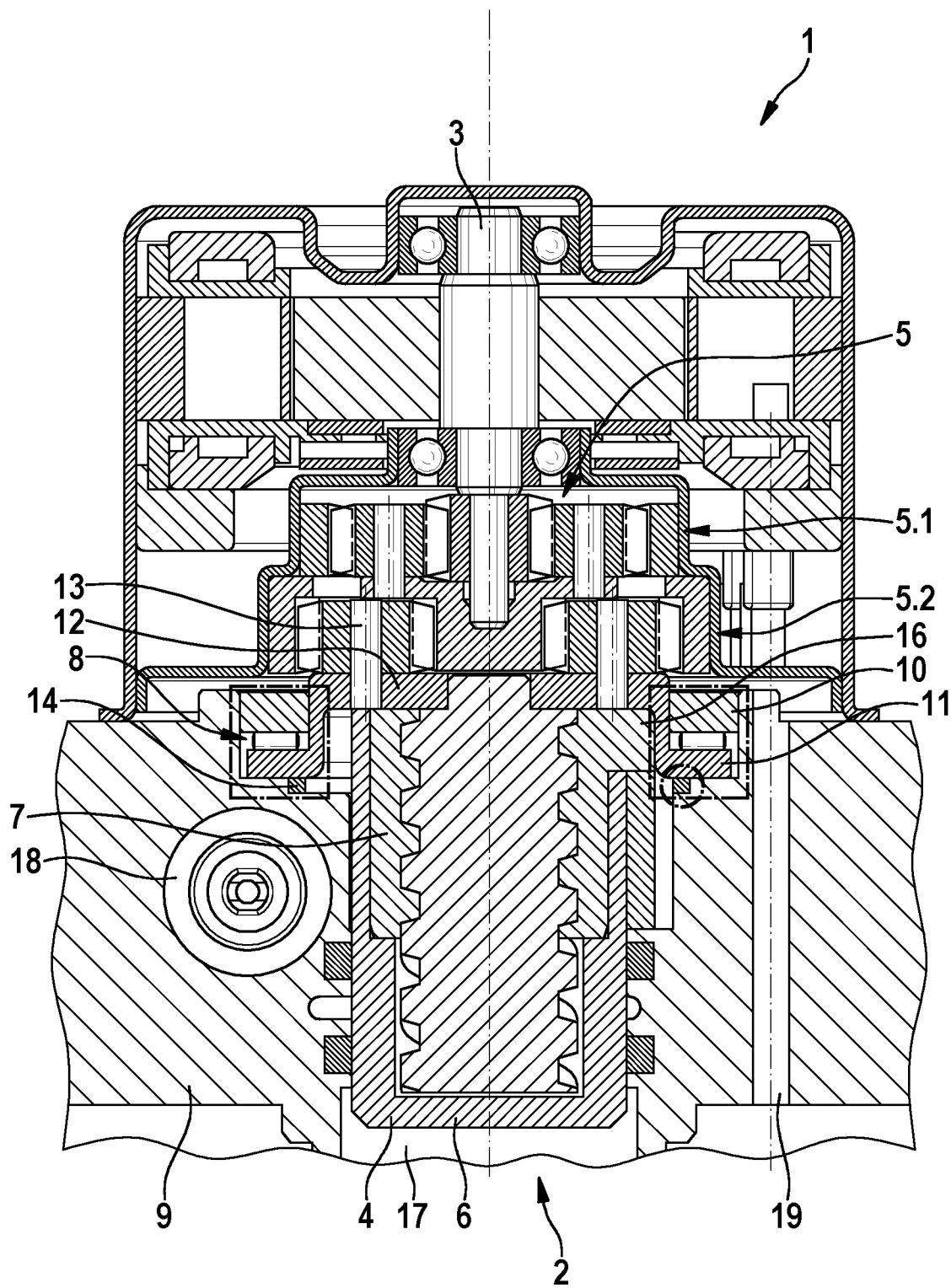
FIG. 1 shows a longitudinal section through a first electromechanical brake pressure generator according to an example embodiment of the present invention including a spindle drive unit and a bearing assembly, having an axial needle bearing and a radial slide bearing.

Electromechanical brake pressure generator 1 illustrated in FIG. 1 includes a housing 9, in which a spindle drive unit 2 is accommodated that is coupled to a piston 4. Spindle drive unit 2 includes a spindle 6 that is rotatably mounted in housing 9 via a bearing assembly 8. A spindle nut 7 is situated on spindle 6 and secured against twisting with the aid of a torque support 16. In the case of a rotational motion of spindle 6, spindle nut 7 moves in the axial direction and, in the process, entrains piston 4, so that same is inserted deeper into a cylindrical pressure chamber 17 that is designed in housing 9.

Spindle 6 is driven by a drive shaft 3 that is operatively connected with spindle 6 via a multi-stage transmission 5 in the form of a planetary gear set. In the present case, transmission 5 includes a first stage 5.1 and a second stage 5.2. Second stage 5.2 includes planet sets that are mounted via pins 13. Pins 13 are, in turn, connected with a pot-shaped inner ring 11 of bearing assembly 8 that is put on spindle 6.

The pot shape of inner ring 11 allows bearing assembly 8 to be positioned at the level of spindle drive unit 2, so that bearing assembly 8 does not require additional installation space in the axial direction. The installation length of brake pressure generator 1 may thus be kept short. In addition, installation space available in housing 9 is used (see dashed lines) that is delimited upward by second stage 5.2 of transmission 5, downward by a housing wall for separating bearing assembly 8 from a brake cylinder 18, radially inward by torque support 16, and radially outward by a current and/or signal line 19.

Figure 2A:
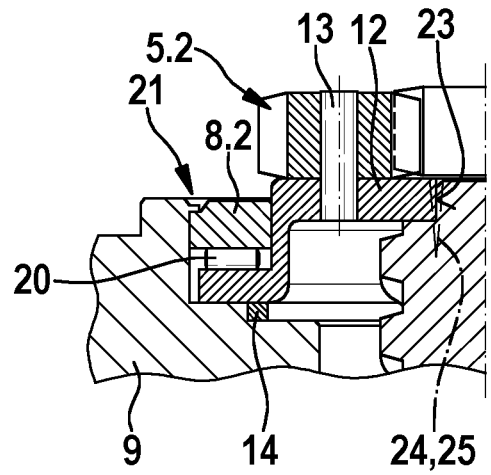
FIGS. 2a) and 2b) shows an enlarged detail of FIG. 1, a) including a caulked outer ring and a one-piece inner ring and b) including a screwed outer ring and a multi-part inner ring.

As is apparent from the enlarged illustration of FIGS. 2a) and 2b), bearing assembly 8 of brake pressure generator 1 of FIG. 1 includes an axial needle bearing 8.1 and a radial slide bearing 8.2. Axial needle bearing 8.1 has needle-shaped rolling elements 20 that require only minor installation space in the axial direction. Radial slide bearing 8.2 is implemented on the left-hand side, i.e., in FIG. 2a), by a contact between outer ring 10 and inner ring 11 and on the right-hand side, i.e., in FIG. 2b), by a plastic ring that is inserted into an outer ring 10 of axial needle bearing 8.1.

Figure 2B:
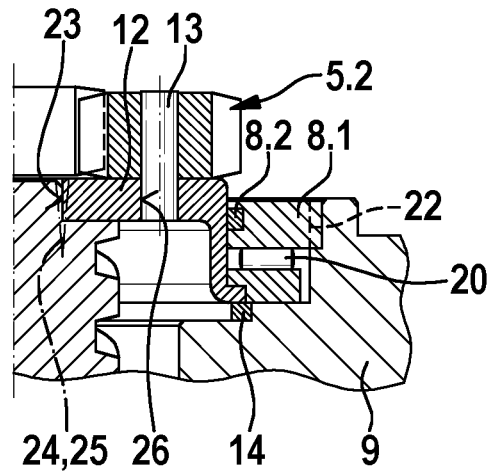

In FIG. 2a), outer ring 10 is additionally fastened in housing 9 with the aid of a caulking 21. In FIG. 2b), the fastening is achieved with the aid of a screw connection 22.

In FIG. 2a) inner ring 11 has a one-piece design and in FIG. 2b) a multi-part design.

Both figures have in common a plastic ring 14, with the aid of which bearing assembly 8 is supported in the axial direction for the case that spindle 6 pulls in the axial direction during operation.

Pot-shaped inner ring 11 of bearing assembly 8 having a one-piece or multi-part design includes a pot bottom 12 having a central recess 23, in which spindle 6 is inserted. For a rotatably fixed connection, pot bottom 12 may be welded to spindle 6. Alternatively, recess 23 in pot bottom 12 and spindle 6 may include corresponding, not rotationally symmetric contours 24, 25. Pot bottom 12 moreover includes bores 26, into which pins 13 are pressed.

Figure 3A:
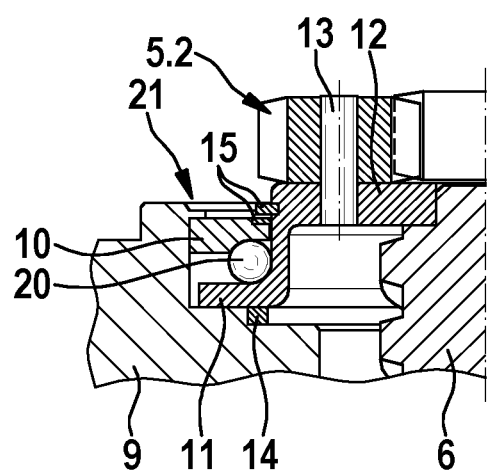
FIGS. 3a) and 3b) shows a detail similarly to FIGS. 2a) and 2b), but including a bearing assembly designed as an angular ball bearing, a) including a one-piece inner ring, and b) including a multi-part inner ring as well as including a cage.
Figure 3B:
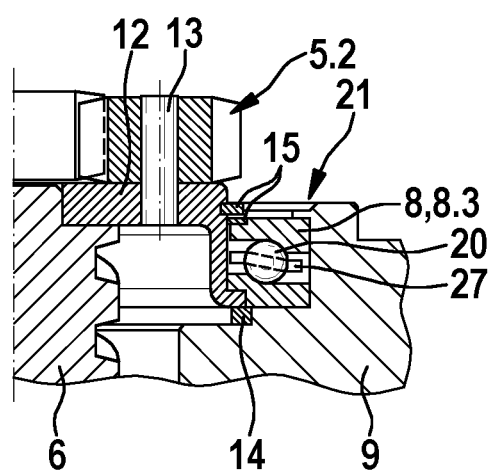

Further preferred specific embodiments are illustrated in FIGS. 3a) and 3b). Both specific embodiments have in common that here, bearing assembly 8 is formed from an angular ball bearing 8.3 including ball-shaped rolling elements 20. These may be guided through a cage 27, as is illustrated in FIG. 3b) by way of example. If a cage 27 is dispensed with, the number of rolling elements 20 may be increased to increase the load rating. Outer ring 10 is caulked in housing 9 in each case. Inner ring 11 has a one-piece design in FIG. 3a) and a multi-part design in FIG. 3b).

Angular ball bearing 8.3 illustrated in FIGS. 3a) and 3b) furthermore has a clip ring 15 that holds together inner ring 11 and outer ring 10. Angular ball bearing 8.3 may thus be pre-assembled and inserted into housing 9 of brake pressure generator 1 as a pre-assembled unit. In the present case, clip ring 15 has a two-part design to form a slide bearing at the same time.

Figure 4:
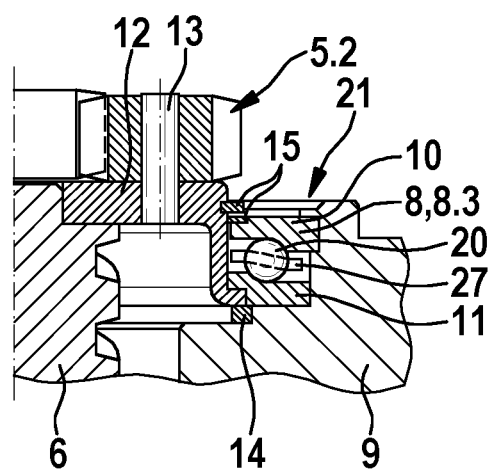
FIG. 4 shows a detail similarly to b), but including a modified outer ring and inner ring.

A further specific embodiment is illustrated in FIG. 4. It is different from the one in FIG. 3b) in particular in that inner ring 11 includes more than two pieces, namely three pieces. A first piece forms pot bottom 12, a further piece forms actual inner ring 11 including the contact surface for rolling elements 20. A third piece connects the two pieces. Each piece may thus be manufactured from a suitable material according to its function. At the same time, each piece has a comparably simple shape, which simplifies the manufacture of inner ring 11.

What is claimed is:

1. An electromechanical brake pressure generator, comprising:
    a spindle drive unit configured to convert a rotational motion of an electric motor-driven drive shaft into a translatory motion of a piston that is coupled to the spindle drive unit, a spindle or a spindle nut of the spindle drive unit being operatively connected with the drive shaft via a multi-stage transmission;
    wherein the multi-stage transmission is a planetary gear set including a first and a second stage, and wherein the spindle or the spindle nut of the spindle drive unit is drivable using the transmission and is rotatably mounted in a housing of the brake pressure generator via a bearing assembly receiving axial and radial forces, wherein the bearing assembly includes a pot-shaped inner ring that has a one-piece or a multi-part configuration and a pot bottom for connecting with the spindle or the spindle nut and for connecting with the transmission via pins.

2. The brake pressure generator as recited in claim 1, wherein the bearing assembly includes an axial needle bearing for receiving the axial forces and a radial slide bearing for receiving the radial forces.

3. The brake pressure generator as recited in claim 1, wherein the bearing assembly includes an angular ball bearing for receiving the axial and radial forces.

4. The brake pressure generator as recited in claim 1, wherein the bearing assembly is completely accommodated in the housing and/or fastened in the housing via an outer ring of the bearing assembly.

5. The brake pressure generator as recited in claim 4, wherein the outer ring is caulked or screwed in the housing.

6. The brake pressure generator as recited in claim 1, wherein the bearing assembly surrounds the spindle and/or the spindle nut.

7. The brake pressure generator as recited in claim 1, wherein the spindle is manufactured from or made of a metal, and/or the spindle nut is manufactured from or made of plastic.

8. The brake pressure generator as recited in claim 1, wherein the spindle is made of steel or aluminum.

9. The brake pressure generator as recited in claim 1, wherein the bearing assembly is supported at the housing via a plastic ring in an axial direction.

10. The brake pressure generator as recited in claim 1, wherein an inner ring of the bearing assembly is supported at the housing via a plastic ring in an axial direction.

11. The brake pressure generator as recited in claim 1, wherein the bearing assembly includes a clip ring that holds together the bearing assembly and/or forms a slide bearing.

12. A braking system for a vehicle, comprising:
    an electromechanical brake pressure generator including:
        a spindle drive unit configured to convert a rotational motion of an electric motor-driven drive shaft into a translatory motion of a piston that is coupled to the spindle drive unit, a spindle or a spindle nut of the spindle drive unit being operatively connected with the drive shaft via a multi-stage transmission;
        wherein the multi-stage transmission is a planetary gear set including a first and a second stage, and wherein the spindle or the spindle nut of the spindle drive unit is drivable using the transmission and is rotatably mounted in a housing of the brake pressure generator via a bearing assembly receiving axial and radial forces, wherein the bearing assembly includes a pot-shaped inner ring that has a one-piece or a multi-part configuration and a pot bottom for connecting with the spindle or the spindle nut and for connecting with the transmission via pins.

* * * * *